INVENTOR.
LUDWIG A. MAJNERI
ATTORNEYS

March 27, 1951  L. A. MAJNERI  2,546,367
HYDRAULIC BRAKING SYSTEM WITH POWER PARKING VALVE
Filed Nov. 27, 1944  4 Sheets-Sheet 2

INVENTOR.
LUDWIG A. MAJNERI
BY Whittemore Hulbert & Belknap
ATTORNEYS

March 27, 1951        L. A. MAJNERI        2,546,367

HYDRAULIC BRAKING SYSTEM WITH POWER PARKING VALVE

Filed Nov. 27, 1944        4 Sheets-Sheet 4

*INVENTOR.*
LUDWIG A. MAJNERI
*BY*
Whittemore Hulbert & Belknap
ATTORNEYS

Patented Mar. 27, 1951

2,546,367

UNITED STATES PATENT OFFICE 2,546,367

HYDRAULIC BRAKING SYSTEM WITH POWER PARKING VALVE

Ludwig A. Majneri, Grosse Pointe, Mich., assignor to The Warner Aircraft Corporation, Detroit, Mich., a corporation of Michigan Application November 27, 1944, Serial No. 565,359

14 Claims. (Cl. 60—54.5)

This invention relates generally to valves for use in connection with hydraulic braking systems and refers more particularly to improvements in power parking valves for hydraulic braking systems.

Hydraulic braking systems usually comprise one or more brakes having hydraulic actuators connected to a manually operable control through a master or actuating cylinder usually supported at a point remote from the brake actuators and connected to the latter by suitable conduits or tubing. Also, in some installations a parking device is associated with the master cylinder and is connected in the system in a manner to maintain fluid under sufficient pressure in the brake actuators to hold the latter in their brake applying positions.

In installations of the above general type embodying a parking device, difficulty has been experienced in maintaining the brakes applied for any appreciable length of time due to the pressure drop in the line between the brakes and parking device. This pressure drop is usually caused by variations in temperature of the surrounding atmosphere and the volume of the fluid trapped in the line extending from the parking device to the brakes is usually so great on large aircraft that the capacity of a master cylinder of practical size is not sufficient to compensate for contraction or expansion of the fluid.

It has been proposed to relieve the above condition to some extent by connecting a temperature compensating device such as a spring loaded piston in the line. This arrangement is impractical on large aircraft as it would necessitate actually operating the master cylinder several times in order to supply sufficient fluid to compensate for the pressure drop in the line resulting from a severe drop in temperature of the surrounding atmosphere. Moreover, such a compensating device would have to possess sufficient capacity to provide for expansion of the trapped fluid should a substantial rise in temperature of the ambient atmosphere occur. This would require a very large temperature compensating device.

With the above in view this invention contemplates a power parking valve adapted for use in braking systems embodying an accumulator and a reservoir as parts thereof. More particularly, it is an object of this invention to provide a parking valve connected in the system in such a manner that it not only acts as a reducing valve to limit the pressure supplied by the accumulator to the required parking pressure but, in addition, operates to replenish fluid from the accumulator in the event of a drop in fluid pressure in the line and to return fluid in the line to the reservoir in the event expansion takes place in the line.

Another object of this invention is to provide a power parking valve assembly capable of being used with at least two independent braking systems to control parking of the brakes in all of the systems. This feature is particularly applicable to aircraft wherein the brakes at opposite wheels are separately controlled by independent braking systems.

Still another object of this invention is to provide a valve assembly for use with two or more separate braking systems, wherein the control valves for the brakes in the respective systems and the single power parking valve form a self-contained unit.

The foregoing as well as other objects will be made more apparent as this description proceeds, especially when considered in connection with the accompanying drawings, wherein.

While the power parking brake valves shown in the several figures of the drawings may be used in practically any installation embodying one or more hydraulic braking systems to enable parking the brakes, nevertheless, the valves illustrated herein are particularly adapted for use in connection with aircraft. As is usually the case, aircraft embodies at least two separate hydraulic braking systems and also employs a high pressure accumulator as a part of its equipment.

Figure 1:
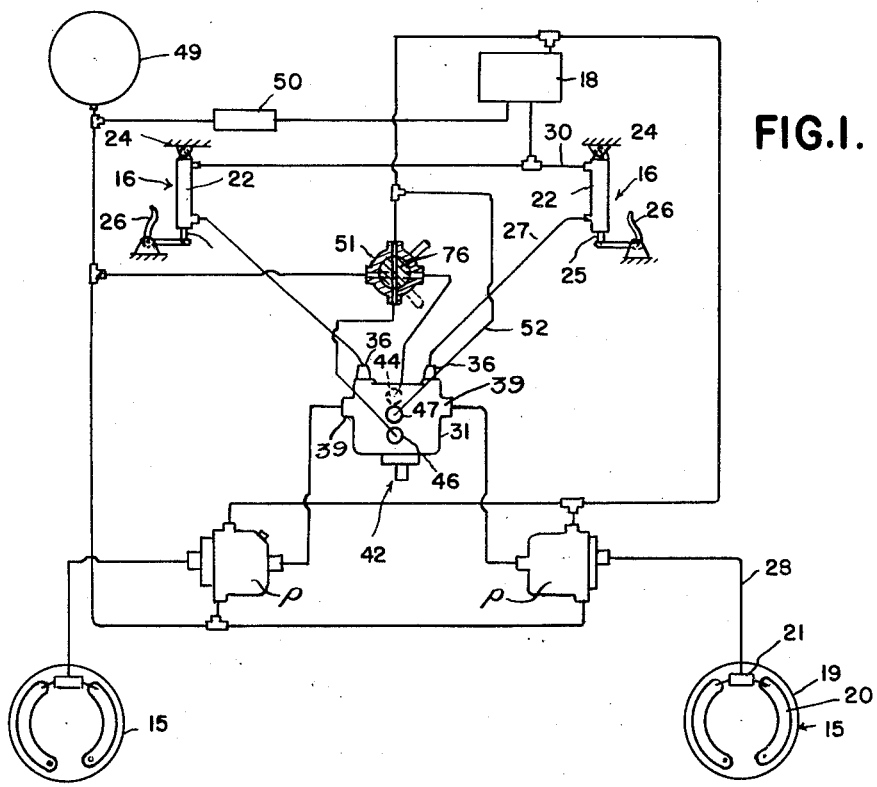
Figure 1 is a diagrammatic view of a brake installation embodying the present invention.

With the above in view, reference will now be made to Figure 1 of the drawings wherein it will be noted that each braking system comprises at least one brake 15, a manually operable pressure producing device such, for example, as a master cylinder 16, a control or shuttle valve 17 (shown in Fig. 1A) and a reservoir 18.

The brake 15, the master cylinder 16 and the reservoir 18 are preferably of standard design and accordingly a detailed description of the same need not be given herein. Briefly, however, each brake 15 comprises a brake drum 19 having brake friction means 20 suitably supported therein and having a hydraulic actuator 21 for operating the brake friction means 20. The device 16 comprises a cylinder 22 and a piston 23 slideably mounted in the cylinder. The upper end of the cylinder is usually suitably pivotally mounted on a fixed support 24 and the lower end of the cylinder is fashioned to enable extending the piston rod 25 therethrough. The piston rod 25 is suitably connected to a manually operable control 26 mounted in such a manner that operation of the control causes the piston 23 to move downwardly in the cylinder 22. The lower end of the cylinder 22 is connected to the shuttle valve 17 by a fluid pressure supply line 27 and the valve 17 in turn is connected to the brake actuator 21 by a supply line 28. The arrangement is such that downward movement of the piston 23 in the cylinder 22 by the operator 26 causes fluid under pressure to flow to the actuator 21 through the shuttle valve 17. The piston 23 is moved upwardly in the cylinder 22 by a spring 29 when the operator 26 is released and the upper end of the cylinder is connected to the reservoir 18 by a conduit 30 to return the fluid in the master cylinder to the reservoir. As will be more fully hereinafter set forth, the actuators 21 are power operated under control of the master cylinders 16 by fluid under relatively high pressure from an accumulator 49. In cases of this type, it is preferred to employ a power valve P in each system between the actuator 21 and the shuttle valve 17 for controlling the flow of fluid under pressure from the accumulator 49 to the actuator 21. The construction of the power valves forms no part of the present invention, and need not be described in detail. It will suffice to point out that the valves P may be similar in construction to the one shown in the Majneri application Serial No. 584,808, filed March 26, 1945, now Patent No. 2,500,555. The power valves are operated by the master cylinders 16 and alternately connect the actuators 21 to the accumulator 49 and reservoir 18 in response to the pressure of the fluid at the actuators.

The shuttle valves 17 for both hydraulic braking systems are supported in a common housing 31 and each valve comprises a plunger 32 which is slideably mounted in a cylindrical chamber 33 formed in the housing 31. Upon reference to Figure 1A of the drawings, it will be noted that each valve chamber 33 is provided with reduced chambers 34 and 35 at opposite ends thereof. The chambers 34 for both shuttle valves are provided with intake ports 36 which respectively communicate with the lower ends of the cylinders 22 in both braking systems and the chambers 35 for both valves are also respectively provided with intake ports 37 which communicate with an annular chamber 38 to be more fully hereinafter described. In addition, the chambers 33 are provided with outlet ports 39 intermediate the inlet ports previously described and respectively communicating with the hydraulic brake actuators 21 in both braking systems.

Each valve plunger 32 has portions at opposite ends which alternatively project into the chambers 34 and 35 upon movement of the valve member in opposite directions. It will also be noted from Figure 1 that each end portion of the valve plunger is provided with an annular groove for receiving an O-ring 40 which serves to prevent the escape of fluid under pressure into the chamber 33 from either of the reduced chambers 34 or 35, depending upon which of these chambers is engaged by the valve plunger 32. The valve plungers 32 are normally held in the positions shown in Figure 1A of the drawings where the chambers 35 are sealed from communication with the outlet ports 39 by means of coil springs 41. In other words the coil springs 41 normally urge the valve plungers 32 to positions wherein communication is established between the devices 16 and the hydraulic brake actuators 21.

Figure 2:
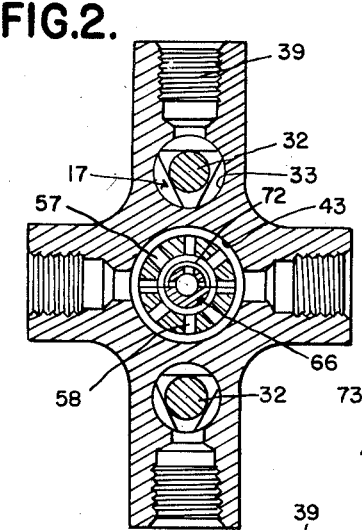
Figure 2 is a cross-sectional view taken substantially on the plane indicated by the line 2—2 of Figure 1A.
Figure 3:
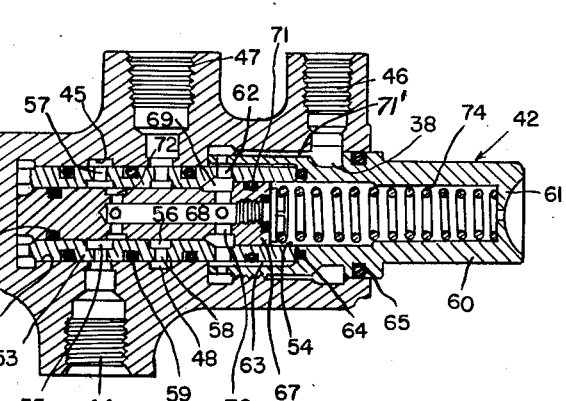
Figure 3 is a longitudinal sectional view taken on the plane indicated by the line 3—3 of Figure 1A.

It will also be noted from the drawings that the housing 31 also forms a support for a third valve 42, which is a constant pressure power parking valve. Referring first to the embodiment of the invention shown in Figures 1 to 3 inclusive, it will be noted that the valve 42 comprises a cylindrical chamber 43 formed in the housing 31 between the chambers 33. The chamber 43 comprises an intake port 44 which communicates with an annular groove 45 surrounding the chamber and is also provided with a longitudinally spaced outlet port 46 which communicates with the annular chamber 38, also surrounding the chamber 43. In addition the chamber 43 is provided with a second outlet port 47 located intermediate the intake port 44 and the outlet port 46. The port 47 communicates with an annular groove 48 which also surrounds the chamber 43.

The intake port 44 is adapted for connection to the high pressure accumulator 49 and the outlet ports 46 and 47 are adapted for connection to the reservoir 18 for the braking systems. The accumulator 49 contains a supply of liquid maintained at relatively high pressure by a suitable pump 50 and the flow of fluid under pressure from the accumulator 49 to the intake port 44 is controlled by a manually operable valve 51. As shown in Figure 1 of the drawings, the valve 51 is of the four-way type and also serves to control communication between the outlet port 46 and the reservoir 18. The outlet port 47 is connected to the reservoir by a conduit 52 which shunts the valve 51 and therefore the valve 51 has no effect on the flow of fluid from the port 47 to the reservoir 18.

A sleeve 53 formed of a material having high wear-resisting characteristics is secured in the chamber 43 and the bore through the sleeve is enlarged at the rear end of the sleeve as indicated by the reference character 54. A pair of annular grooves 55 and 56 are formed in the inner surface of the sleeve and respectively assume positions directly opposite the grooves 45 and 48. The annular groove 55 communicates with the annular groove 45 through the medium of circumferentially spaced radial ports 57 and the groove 56 communicates with the groove 48 through the medium of a plurality of circumferentially spaced radial ports 58. The outer surface of the sleeve 53 is provided with three O-rings 59, one positioned between the radial ports 57 and 58 and the other two respectively located at opposite sides of these ports. The O-rings engage the inner surface of the chamber 43 to prevent the escape of fluid through the joint between the sleeve and chamber 43.

Figure 1A:
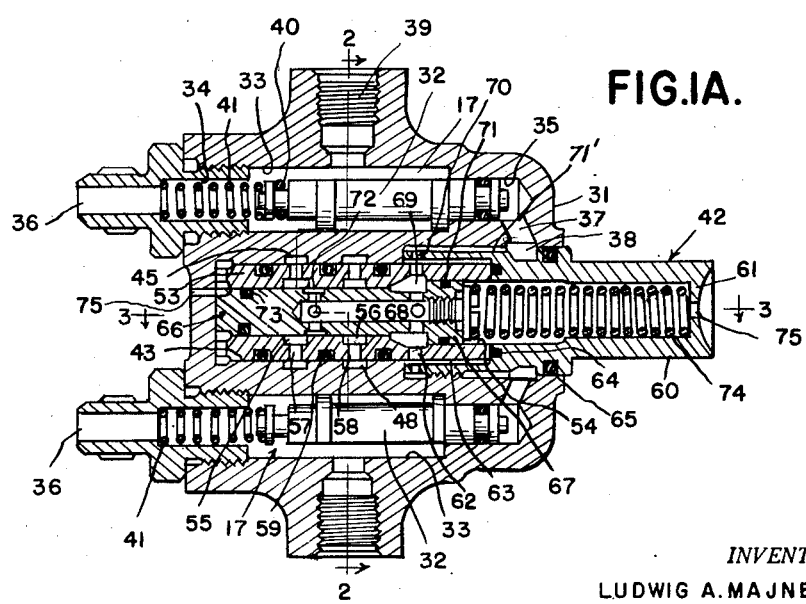
Figure 1A is a sectional view through a valve assembly construction in accordance with this invention.

A second sleeve 60 is supported in the rear end of the chamber 43 in axial alignment with the sleeve 53 and is provided with a transverse wall 61 at the rear end thereof. The front end of the sleeve 60 is enlarged and receives the adjacent rear end portion of the sleeve 53. As shown in Figure 1A, the internal diameter of the enlarged front end portion of the sleeve 60 is sufficiently greater than the external diameter of the adjacent end of the sleeve 53 to form an annular passage 63 around the sleeve 53. The front end of the passage 63 communicates with the interior of the sleeve 53 through the medium of radial ports 62 and the rear end of the annular passage 63 communicates with the annular chamber 38 through the medium of parts 70 and passages 71'. An O-ring seal 64 is positioned between the adjacent ends of the two sleeves to prevent the escape of fluid from the annular passage 63. A similar seal 65 is arranged between the sleeve 60 and rear end of the chamber 43 to prevent the escape of fluid under pressure from the chamber 38.

A valve plunger 66 is supported in the sleeve 53 for sliding movement in opposite directions and is provided with an enlarged portion 67 at the rear end which has a sliding engagement with the enlarged portion 54 of the sleeve 53. The reduced portion of the valve plunger is lapped in the sleeve 53 and is formed with an axially extending chamber 68.

The enlarged end portion 67 of the valve plunger cooperates with the adjacent surface of the sleeve 53 to form an annular chamber 69 in registration with the radial ports 62 and also communicating with the chamber 68 in the valve plunger through the medium of the radial ports 70 formed in the valve plunger adjacent the front side of the enlargement 67. An O-ring seal 71 is carried by the enlargement 67 for contact with the adjacent surface of the sleeve 53 to prevent the escape of fluid under pressure from the annular chamber 69. The chamber 68 in the valve plunger also communicates with an annular groove 72 formed in the outer surface of the valve plunger in a position to alternatively register with the inlet and outlet ports 44 and 47 upon movement of the valve plunger in opposite directions. An O-ring seal 73 is positioned on the forward end of the valve plunger for engagement with the inner surface of the sleeve 53 to prevent the escape of fluid under pressure through the lapped joint between the valve plunger and sleeve 53. Attention is also called to the fact at this time that the valve plunger 66 is normally urged to a position wherein the front end thereof abuts the corresponding end of the chamber 43 by coil spring 74. The coil spring 74 is positioned in the sleeve 60 with one end abutting the transverse wall 61 and with the opposite end abutting the rear end of the valve plunger. The transverse wall 61 and the front wall of the chamber 43 are vented to the atmosphere through openings 75 in order to avoid trapping air in the valve assembly during movement of the valve plunger in either direction.

Referring now to the operation of the valve assembly and assuming that the several parts thereof are in the relative positions shown in Figure 1A, it will be noted that the ports 37 are closed by the shuttle valves 17 so that the brakes in either or both the braking systems may be operated in the usual manner. In the event it is desired to operate the brakes for parking purposes, the four-way valve 51 is manipulated to register the passage 76 with the accumulator 49 and the intake port 44. As a result fluid under pressure from the accumulator enters the chamber 68 in the valve plunger and flows through the radial ports 70 into the annular chamber 69. Inasmuch as the chamber 69 is in constant communication with the annular chamber 38, fluid under pressure is admitted to the latter chamber and flows from this chamber through the ports 37 to the chambers 35. The fluid under pressure in the chambers 35 moves the shuttle valves 17 forwardly against the action of the springs 41 and closes the intake ports 36. Also, the rear ends of the shuttle valves are moved out of the chambers 35 to enable fluid under pressure to flow through the outlet ports 39 to the brake actuators 21.

As fluid under pressure builds up in the annular chamber 69, it acts upon the enlargement 67 on the valve plunger 66, tending to move the latter rearwardly against the action of the spring 74. Whenever the force acting on the enlargement 67 of the valve plunger becomes greater than the force exerted by the spring 74, the valve plunger moves rearwardly and registers the annular groove 72 with the annular groove 56. Thus the chamber 69 is connected to the outlet port 47 and fluid is permitted to return to the reservoir 18 through the conduit 52. As a result the hydraulic pressure in the supply chamber 69 is reduced until a balance is again established, whereupon the spring 74 returns the valve plunger to a position wherein the annular groove 72 is located between the grooves 55 and 56.

When it is desired to restore the braking systems to their normal operating positions, the four-way valve 51 is moved to a position wherein the passage 76 establishes communication between the reservoir 18 and outlet port 46. Inasmuch as the outlet port 46 communicates with the annular chamber 38, it follows that fluid under pressure in the braking systems return to the reservoir 18 and the shuttle valves 17 are returned to the positions shown in Figure 1A by the springs 41.

Figure 4:
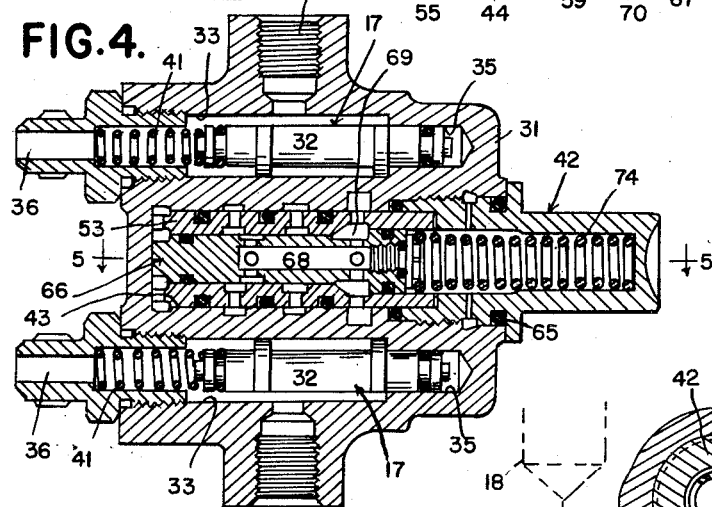
Figure 4 is a view similar to Figure 1A and showing a modified form of valve assembly.
Figure 6:
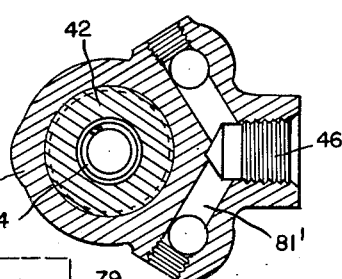
Figure 6 is a cross-sectional view taken on the plane indicated by the line 6—6 of Figure 5.
Figure 5:
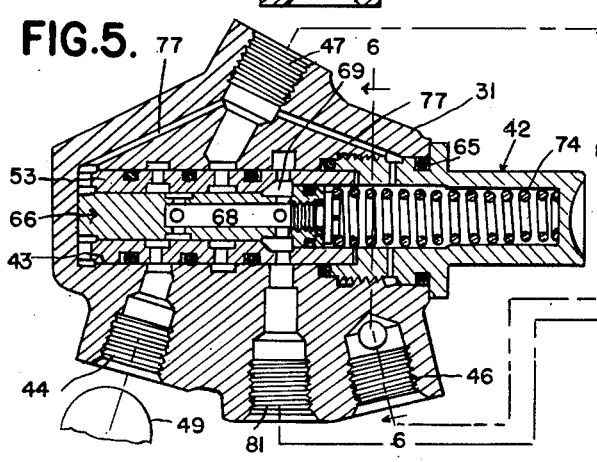
Figure 5 is a sectional view taken on the plane indicated by the line 5—5 of Figure 4.

Upon reference to the embodiment of the invention shown in Figures 4 to 6 inclusive, it will be noted that in the interests of simplicity, corresponding parts of this valve assembly are indicated by the same reference characters used in describing the first form of this invention. The principal difference between the embodiment of the invention shown in Figures 4 to 6 inclusive and the first described form of this invention is that opposite ends of the valve plunger 66 are vented to the reservoir 18 through the outlet port 47 and through passages 77 which extend from the port to opposite ends of the valve chamber 43.

A further distinguishing feature is that the intake port 44 is arranged in constant communication with the accumulator 49 so that operation of the power parking valve may be controlled by a three-way valve 78. One port 79 of the three-way valve 78 is connected to the reservoir 18 and the diametrically opposed port 80 is connected to the annular chamber 69 through a port 81. The intermediate port 82 is connected to the outlet port 46 with the result that when the passage 83 through the valve 78 is in the position shown, the parking brake valve is inoperative. In this position of the valve, the reduced parking pressure constantly maintained in the chamber 69 is prevented from reaching the brake due to the fact that the port 80 in the three-way valve is closed. On the other hand, when the passage 83 connects the ports 80 and 82, the parking valve is rendered operative to actuate the brakes in both systems. In other words, the outlet ports 46 and 81 are connected so that fluid under pressure from the accumulator passes through the ports 81' to the shuttle valves 17 and operates the latter in the same manner described in connection with the first embodiment of this invention.

Figure 7:
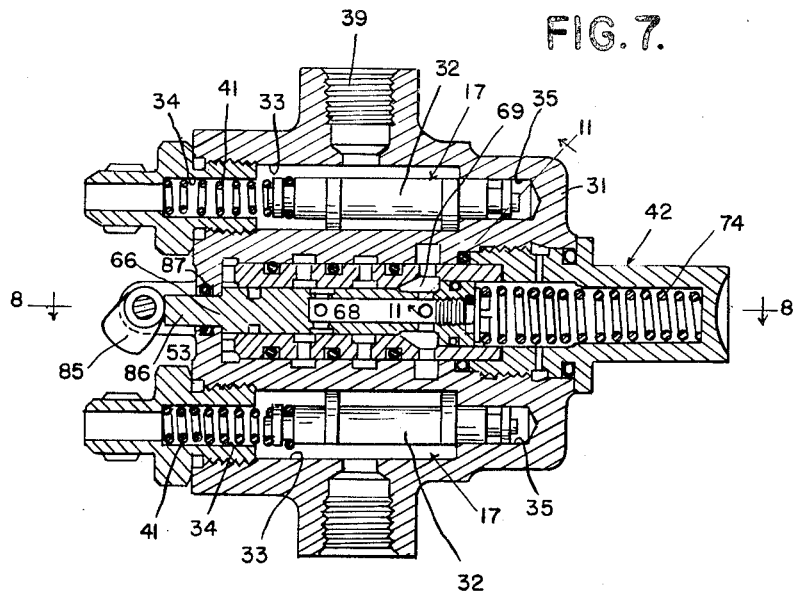
Figure 7 is a section view through still another modified construction of valve assembly.
Figure 8:
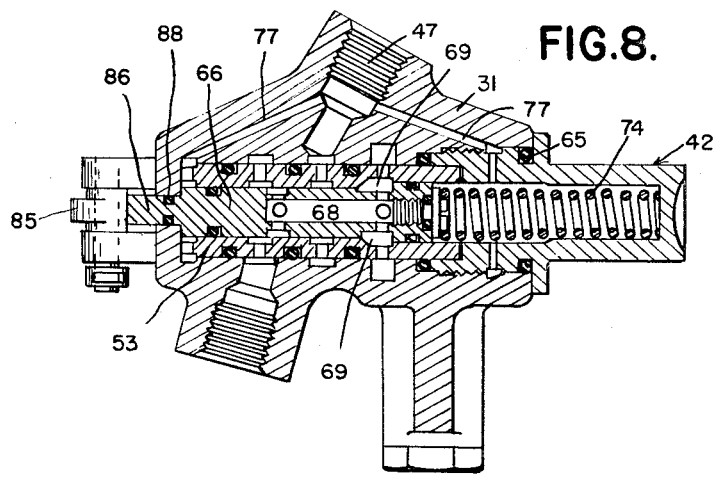
Figure 8 is a sectional view taken on the plane indicated by the line 8—8 of Figure 7.
Figure 9:
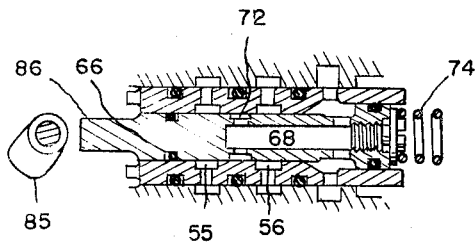
Figures 9 and 10 are respectively longitudinal sectional views showing the power parking brake valve in different positions.

The embodiment of the invention shown in Figures 7 to 11 inclusive is similar to the embodiment shown in Figures 4 to 6 inclusive, but differs from the latter in that the valve plunger 66 is operated by a cam 85 supported for rotation on the housing 31 directly opposite the front end of the valve chamber 43. As shown in Figure 7 the valve plunger 66 is provided with an extension 86 which projects through a bore in the front end of the housing for engagement with the cam. A suitable O-ring seal 87 surrounds the extension 86 to prevent the escape of fluid from the housing. It is pointed out that the danger of leakage past the extension is very slight due to the fact that the seal 87 is only submitted to the relatively low reservoir pressure.

The position of the valve shown in Figure 7 is obtained for only a short duration and is temporarily held in this position by the spring 74. It will be noted that when the valve is in the position shown in Figure 7, fluid under pressure from the accumulator 49 is supplied to the chambers 35 at the shuttle valves 17 in the same manner as previously described in connection with the first embodiment of this invention. The valve remains in this position until the hydraulic pressure in the chamber 69 overcomes the force of the spring 74 and moves the valve plunger 66 to the right or in other words to the position shown in Figure 9 where the annular groove 72 floats between the grooves 55 and 56.

Figure 10:
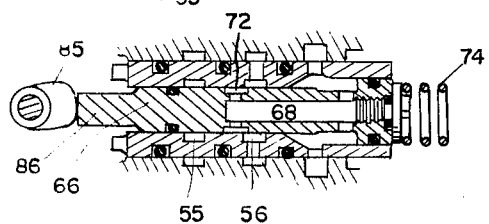
Figure 11:
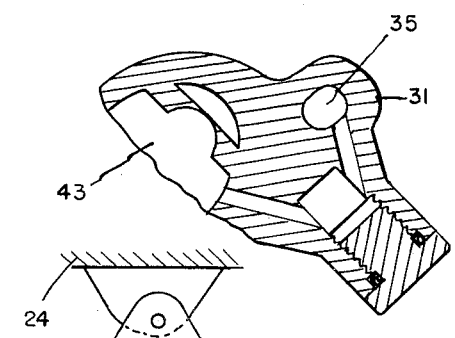
Figure 11 is a fragmentary sectional view taken substantially on the plane indicated by the line 11—11 of Figure 7.
Figure 12:
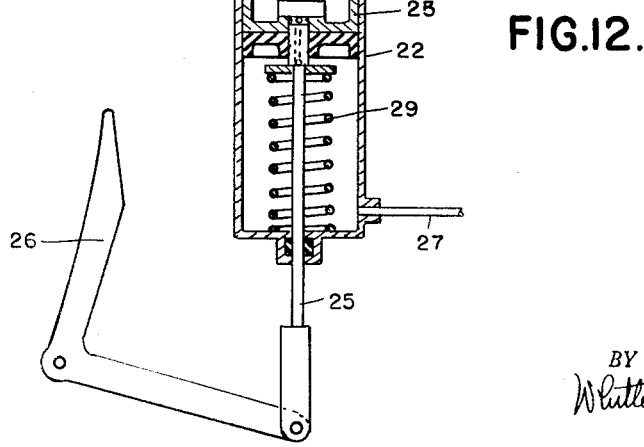
Figure 12 is a longitudinal sectional view through one type of master cylinder assembly employed in connection with the valve assembly.

When it is desired to unpark the brakes in the systems the cam 85 is swung to the position thereof shown in Figure 10. As a result of this movement of the cam the valve plunger 66 is moved rearwardly against the action of the spring 74 to a position wherein the groove 72 registers with the groove 56. Inasmuch as the groove 56 communicates with the reservoir 18 through the outlet port 47, it follows that the fluid under pressure in the braking systems is permitted to return to the reservoir and the shuttle valves 17 again assume the positions shown in Figure 7 to enable normal operation of the brakes.

From the foregoing it will be noted that each embodiment of this invention discloses a power parking valve for maintaining the brakes in one or more hydraulic braking systems applied irrespective of variations in pressure caused by atmospheric conditions. It will also be noted that each embodiment discloses a constant pressure parking valve capable of being installed in a common housing with the control valves for one or more hydraulic braking systems.

What I claim as my invention is:

1. Fluid pressure operated mechanism comprising a source of fluid under pressure, a pressure producing device, a reservoir, an actuator, a valve assembly comprising a housing having a valve chamber provided with an inlet port connected to the pressure producing device, a second inlet port in the chamber spaced from the first inlet port and adapted to be connected to the source of fluid under pressure, an outlet port in the chamber between the inlet ports and having a fluid connection with the actuator, a valve member movable in opposite directions in said chamber and having portions alternatively closing the inlet ports, means normally urging the valve member to a position wherein the first inlet port is open to the outlet port and wherein the second inlet port is closed to the outlet port, said valve adapted to be moved by fluid under pressure from the second inlet port to a position wherein the first inlet port is closed and wherein the outlet port is connected to the second inlet port, a second valve chamber in said housing having an inlet port communicating with the source of fluid under pressure and having an outlet port communicating with the second inlet port in the first chamber, a third port in said second valve chamber and having a fluid connection with the reservoir, and a valve member movable in opposite directions in said second chamber in response to pressure variations at the actuator and having means for alternately connecting the outlet port in the second chamber to the source of fluid under pressure and reservoir upon movement of the second valve member in opposite directions.

2. Fluid pressure operated mechanism comprising a pair of pressure producing devices, a source of fluid under pressure, a pair of fluid pressure operated actuators, a valve assembly including a housing provided with two spaced valve chambers respectively having spaced inlet and outlet openings, the inlet openings being respectively connected to the pressure producing devices and the outlet openings being respectively connected to the actuators, a valve member in each chamber normally urged to a position wherein relatively free flow of fluid is provided from the inlet to the outlet openings and having a portion adapted to close the inlet opening, a second inlet opening in each chamber normally closed by the valve member therein and connected to the source of fluid under pressure, said second inlet openings being arranged to direct fluid under pressure against the valve members to move the latter to a position wherein the first inlet openings are closed thereby and wherein the flow of fluid under pressure is established from the second inlet openings to the outlet openings, a third chamber in the housing between the source of fluid under pressure and the pair of chambers, said third chamber having inlet and outlet openings respectively communicating with the source of fluid under pressure and with the second inlet openings in said pair of chambers, and a valve member movable in opposite directions in response to pressure variations at the actuator and having means for alternatively connecting the outlet port in the third chamber to the source of fluid under pressure and reservoir upon movement of the last named valve member in opposite directions.

3. Fluid pressure operated mechanism comprising a source of fluid under pressure, a reservoir, a pair of pressure producing devices, a pair of fluid pressure operated actuators, a valve assembly including a housing provided with two spaced valve chambers respectively having space inlet and outlet openings, the inlet openings being respectively connected to the pressure producing devices and the outlet openings being respectively connected to the actuators, a valve member in each chamber normally urged to a position wherein relatively free flow of fluid is provided from the inlet to the outlet openings and having a portion adapted to close the inlet opening, a second inlet opening in each chamber normally closed by the valve member therein and connected to the source of fluid under pressure, said second inlet openings being arranged to direct fluid under pressure against the valve members to move the latter to a position wherein the first inlet openings are closed thereby and wherein the flow of fluid under pressure is established from the second inlet openings to the outlet openings, a third chamber in the housing between the source of fluid under pressure and the pair of chambers, said third chamber having inlet and outlet openings respectively communicating with the source of fluid under pressure and with the fluid reservoir, a pressure chamber in the third chamber communicating with both the second named inlet openings in the pair of chambers, and a valve member slidably supported in the third chamber and having means for alternately connecting the pressure chamber to the source of fluid under pressure and to the reservoir upon movement of the valve member in opposite directions in the third chamber.

4. Fluid pressure operated mechanism comprising an actuator, a source of fluid under pressure, a reservoir, a pressure producing device, a valve assembly including a housing having a valve chamber provided with an inlet port connected to the pressure producing device, a second inlet port in the chamber spaced from the first inlet port and connected to the source of fluid under pressure, an outlet port in the chamber between the inlet ports and connected to the actuator, a valve member movable in opposite directions in said chamber and having portions alternatively closing the inlet ports, means normally urging the valve member to a position wherein fluid flows from the first inlet port to the outlet port and wherein the second inlet port is closed thereby, said valve adapted to be moved by fluid under pressure from the second inlet port to a position wherein the first inlet port is closed and wherein the outlet port is connected to the second inlet port, a second valve chamber in said housing having an inlet port communicating with the source of fluid under pressure and having a pressure space communicating with the second inlet port in the first chamber, an outlet port in the second chamber connected to the fluid reservoir, a second valve member movable in one direction in the second chamber for connecting the inlet port in the second chamber to the second inlet port in the first chamber through the pressure space and movable in the opposite direction to close the latter connection and establish communication between the inlet port in the second chamber and reservoir, spring means normally urging the second valve in said one direction, and means on the second valve responsive to the pressure of the fluid in the pressure space to urge the second valve against the action of the spring means in said opposite direction.

5. Fluid pressure operated mechanism comprising a source of fluid under pressure, a reservoir, a pair of fluid pressure operated actuators, fluid connections respectively connecting the source of fluid pressure and reservoir to the actuators, and a pressure reducing valve common to both actuators and located in said fluid connections for alternately connecting the actuators to the source and reservoir in dependence upon the pressure of the fluid at the actuators.

6. Fluid pressure operated mechanism comprising a source of fluid under pressure, a pair of manually operable pressure producing devices, a pair of fluid pressure operated actuators, fluid connections respectively connecting the actuators to said devices, a pair of shuttle valves respectively located in the fluid connections and normally positioned to maintain communication between the devices and actuators, a pressure regulating valve between the shuttle valves and having a pressure chamber connected to the source of fluid under pressure, fluid connections respectively connecting the chamber to the first named fluid connections and normally closed by the shuttle valves, and a valve member in the pressure regulating valve between the source of fluid under pressure and pressure chamber for connecting the former to the latter in one position thereof.

7. Fluid pressure operated mechanism comprising a source of fluid under pressure, a reservoir, a pair of manually operable pressure producing devices, a pair of fluid pressure operated actuators, fluid connections respectively connecting the actuators to the devices, a pair of shuttle valves respectively located in the fluid connections and normally positioned to establish communication between said devices and actuators, a pressure regulating valve between the shuttle valves and having a pressure chamber respectively connected to the source of fluid under pressure and reservoir, fluid connections respectively connecting the pressure chamber to the first named fluid connections and normally closed by the shuttle valves, and a valve member movable in opposite directions in the shuttle valve for alternatively connecting the pressure chamber to the source of fluid under pressure and said reservoir.

8. Fluid pressure operated mechanism comprising a source of fluid under pressure, a pair of fluid pressure operated actuators, two independently operable pressure producing devices having outlet openings, fluid connections respectively connecting the outlet openings to said actuators, means for connecting the source of fluid under pressure to said actuators independently of the pressure producing devices including a pressure relief valve connected to both actuators in parallel relationship to the pressure producing devices.

9. The fluid pressure operated mechanism set forth in claim 8 in which the relief valve is operated by the fluid pressure at the actuators to alternatively connect the actuators to the source and to a reservoir.

10. The fluid pressure operated mechanism set forth in claim 9 in which a pair of control valves are respectively located between the pressure relief valve and said actuators for controlling the flow of fluid between both actuators and said relief valve.

11. The fluid pressure operated mechanism set forth in claim 10 in which the control valves are operated by the fluid pressure producing devices.

12. The fluid pressure operated mechanism set forth in claim 11 in which the control valves respectively control communication between the pressure producing devices and said actuators.

13. The fluid pressure operated mechanism set forth in claim 10 in which the control valves are of the shuttle type operable in one position to close communication between the relief valve and actuators and to open communication between the actuators and pressure producing devices, and operable in another position to close communication between the pressure producing devices and actuators and to open communication between the latter and relief valve.

14. The fluid pressure operated mechanism set forth in claim 8 in which a valve is located between the pressure relief valve and one actuator for controlling the flow of fluid between the relief valve and actuator.

LUDWIG A. MAJNERI.

REFERENCES CITED

The following references are of record in the file of this patent:

UNITED STATES PATENTS

| Number | Name | Date |
|---|---|---|
| 180,460 | Chadwick | Aug. 1, 1876 |
| 2,148,268 | Kerr | Feb. 21, 1939 |
| 2,167,328 | Beggs | July 25, 1939 |
| 2,185,277 | Stelzer | Jan. 2, 1940 |
| 2,200,829 | Beharrell et al. | May 14, 1940 |
| 2,331,214 | Milster | Oct. 5, 1943 |
| 2,343,809 | Schnell | Mar. 7, 1944 |
| 2,367,194 | Boldt | Jan. 16, 1945 |
| 2,389,667 | Hudson | Nov. 27, 1945 |
| 2,408,799 | Melichar | Oct. 8, 1946 |